United States Patent [19]

Fischer

[11] Patent Number: 4,555,961
[45] Date of Patent: Dec. 3, 1985

[54] CONNECTING ROD MADE OF FIBER REINFORCED SYNTHETIC MATERIAL

[75] Inventor: Thomas Fischer, Augsburg, Fed. Rep. of Germany

[73] Assignee: Messerschmitt-Boelkow-Blohm Gesellschaft mit beschraenkter Haftung, Munich, Fed. Rep. of Germany

[21] Appl. No.: 508,031

[22] Filed: Jun. 27, 1983

[30] Foreign Application Priority Data

Jul. 7, 1982 [DE] Fed. Rep. of Germany ....... 3225324
Jul. 7, 1982 [DE] Fed. Rep. of Germany ....... 3225325

[51] Int. Cl.⁴ .............................................. G05G 1/00
[52] U.S. Cl. ............................. 74/579 E; 123/197 AC; 29/156.5 A
[58] Field of Search ............. 74/579 R, 579 F, 579 E, 74/581, 44; 29/156.5 A; 123/197 AB, 197 R, 197 AC; 92/187

[56] References Cited

U.S. PATENT DOCUMENTS

| | | | |
|---|---|---|---|
| 1,130,982 | 3/1915 | Kinkead | 74/579 E |
| 2,776,175 | 1/1957 | Waite | 74/579 E |
| 3,768,760 | 10/1973 | Jensen | 428/105 |
| 4,038,885 | 8/1977 | Jonda | 74/579 R |
| 4,183,261 | 1/1980 | Eiselbrecher et al. | 74/579 R |
| 4,329,915 | 5/1982 | Schulz | 29/156.5 A |
| 4,350,728 | 9/1982 | Huang et al. | 428/105 |
| 4,379,798 | 4/1983 | Palmer et al. | 428/113 |

FOREIGN PATENT DOCUMENTS

| | | | |
|---|---|---|---|
| 1198613 | 8/1965 | Fed. Rep. of Germany | 74/579 E |
| 2951112 | 7/1981 | Fed. Rep. of Germany | 74/579 E |
| 3004575 | 8/1981 | Fed. Rep. of Germany | 74/579 E |
| 599723 | 11/1959 | Italy | 74/579 E |
| 57-97912 | 6/1982 | Japan | 74/579 R |
| 526309 | 9/1940 | United Kingdom | 74/579 E |
| 981446 | 1/1965 | United Kingdom | 74/579 E |
| 1364317 | 8/1972 | United Kingdom | |
| 2078337 | 1/1982 | United Kingdom | 74/579 R |

Primary Examiner—Kenneth J. Dorner
Assistant Examiner—Vinh Luong
Attorney, Agent, or Firm—W. G. Fasse; D. H. Kane, Jr.

[57] ABSTRACT

A connecting rod has a closed bearing at one end for connecting, for example, a piston bolt to the rod. At the other end the rod has a divided bearing for connecting, for example, a crankpin to the rod. The rod is made of fiber reinforced synthetic materials. The divided bearing is enclosed by an inner and an outer bearing bail and by a compression member. The free ends of a fiber reinforced loop which surrounds the closed bearing and the ends of the inner and outer bearing bails are formed into flanges which are interlocked by bolts. In another embodiment an endless loop is folded to form an open loop and the free ends of the open loop legs are interconnected by a bolt extending through the loop ends and through an outer bail made of fiber compound material or metal.

19 Claims, 6 Drawing Figures

CONNECTING ROD MADE OF FIBER REINFORCED SYNTHETIC MATERIAL

BACKGROUND OF THE INVENTION

The present invention relates to a connecting rod made of fiber reinforced synthetic material. Such rods are, for example, used as crankshaft rods, whereby one rod head or rod end is connected, for example, to a piston bolt by means of a closed cylindrical bearing while the other rod end or rod head is connected, for example, to a crankpin by means of a divided cylindrical second bearing. The second bearing is formed by the divided big end of the rod constructed as a half shell cooperating with a substantially mirror-symmetrically shaped second half shell forming an outer bearing cover bail. These components are held together by a loop of unidirectionally oriented fiber strands looping around the closed bearing cylinder, whereby the fiber strands extend in the longitudinal direction of the rod. The bearing cover bail is secured to the free ends of the loop forming fiber strands.

German Patent Publication (DE-OS) No. 3,004,575 discloses a crankshaft rod of the type described above. The crankpin bearing of such a rod is divided for assembly or mounting reasons. The known crankshaft rod has a core of synthetic material encased by a metal jacket. Such a structure has, compared to a full metal construction, a substantially smaller mass or weight and hence using such crankshaft rods results in an increased or improved quiet run and an improved efficiency of the respective engine, especially if high r.p.m. stroke piston engines are involved. The ideal solution under such operating conditions is to avoid any type of metal components. However, by omitting merely the metal jacket in the prior art crankshaft rod, the result would be, among others, that the required strength relative to compression and tensile forces or stress is not assured anymore. The remaining fiber loop which is only capable of taking up tensile stress would buckle in response to compression stress. Another undesirable feature of such prior art rods which comprise a metal jacket, is seen in that the load distribution is uneven. The metal jacket which functions, among its other functions, as a supporting outer shell of the fiber loop is not fully utilized because the compound or interaction of two materials each having a different modulus of elasticity is not ideal when the crankshaft rod is under load conditions. Under such conditions the stiffer fiber reinforced material is subjected to most of the loads while the supporting outer metal jacket is not fully utilized.

German Patent Publication (DE-OS No. 2,951,112) discloses a cam shaft connecting rod with an endless loop of fiber compound material. Such loop has a layered construction, but does not provide a hint toward an open loop construction because this prior art rod has two closed bearings.

OBJECTS OF THE INVENTION

In view of the above it is the aim of the invention to achieve the following objects singly or in combination:
to construct a connecting rod of the type described above, which does not require any metal components while still assuring the required strength characteristics;
to assure the required strength characteristics relative to all load conditions resulting in tensile stress, compression stress, and shearing stress;
to avoid the use of an endless fiber loop in the construction of such connection rods or to use an endless loop in such a way that one bearing is constructed as an open, divided bearing nevertheless;
to provide a special interlocking between the free ends of the legs of an open ended fiber loop and a bearing cover bail of fiber compound material and with a further inner bail arranged opposite the cover bail; and
to use an adhesive bond between all fiber compound components of the connecting rod which bond may be subjected to high dynamic loads.

SUMMARY OF THE INVENTION

The connecting rod according to the invention employs an open or closed fiber loop having legs with free open ends reaching toward the divided bearing. The free ends of the fiber loop legs extend substantially radially outwardly, or rather, substantially perpendicularly to the longitudinal axis of the connecting rod to form bearing flanges having holes therein for a connecting bolt. The flanges form an open rod head and the connecting bolts extend into a threaded hole in an outer bearing cover bail or through such outer bearing cover bail for closing the open rod head when the rod is mounted to a crankshaft, for example. The outwardly extending free ends of the fiber loop legs are joined to each other by an inwardly disposed inner bearing bail also made of fiber compound material in which the fibers are arranged unidirectionally in parallel to each other and/or in a crosswise orientation with regard to the bail configuration or bail extension. The inwardly disposed bearing bail forms part of an open rod head. A compression rod is operatively interposed between the above mentioned closed cylindrical bearing and the inwardly disposed inner bearing bail on the one hand, and, on the other hand, between the legs of the fiber loop. The compression rod is made of fiber strands extending at least in one direction in parallel to the longitudinal axis of the connecting rod.

Thus, the invention employs in addition to the rod which takes up compression loads, the inwardly disposed bearing bail which interconnects the flanges thereby greatly contributing to a sufficient strength of the connecting rod relative to shearing stress resulting from cross forces generated by mass accelerations when the rod is under operating conditions. This sufficient strength is especially achieved for the connection between the fiber loop and the compression rod because the inner bearing bail which couples the free ends of the loop legs of the fiber loop to each other in a force transmitting manner permits using an open ended loop or a closed loop folded to provide two open loop legs in the first place, thereby avoiding the multi-bends of an endless fiber loop heretofore necessary in the area of the open rod head, usually the big end of a crankshaft rod. The inner bearing bail makes it possible to separate the free ends of the fiber loop legs or to form two free legs by folding an endless loop whereby the connection between the loop and the compression rod provides a sufficient strength against shearing stress caused by cross-forces when the rod is subject to mass acceleration. Additionally, the inner bearing bail, which couples the free loop legs in a force transmitting manner, permits avoiding an outer jacket for the big end rod head and it results in an efficient space utilization while nevertheless reinforcing the open rod head or end against the bearing pressure in the flange bores or holes through which the connecting bolts extend, especially if an intermediate fiber compound material layer with a crosswise fiber orientation is interposed between the inner bail and the flanges formed by the free loop ends.

In another embodiment of the invention the open loop is formed by folding an endless loop at least once intermediate its loop ends so that the folded loop loops around the closed bearing and the folded loop ends extend to form the divided big end of the connecting rod together with a bolt extending through the loop ends and through an outer bearing cover bail cooperating with an inner bearing bail in holding the divided bearing in the big end of the connecting rod whereby a compression rod extends lengthwise between the closed bearing and the inner bearing bail and between the loop ends or legs. The fibers in the folded loop legs and in the compression rod extend unidirectionally substantially in parallel to one another, whereby the compression rod fills the space between the folded loop legs. This structure also does not require any external supporting components. Any inserts may be made of fiber compound materials.

BRIEF FIGURE DESCRIPTION

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
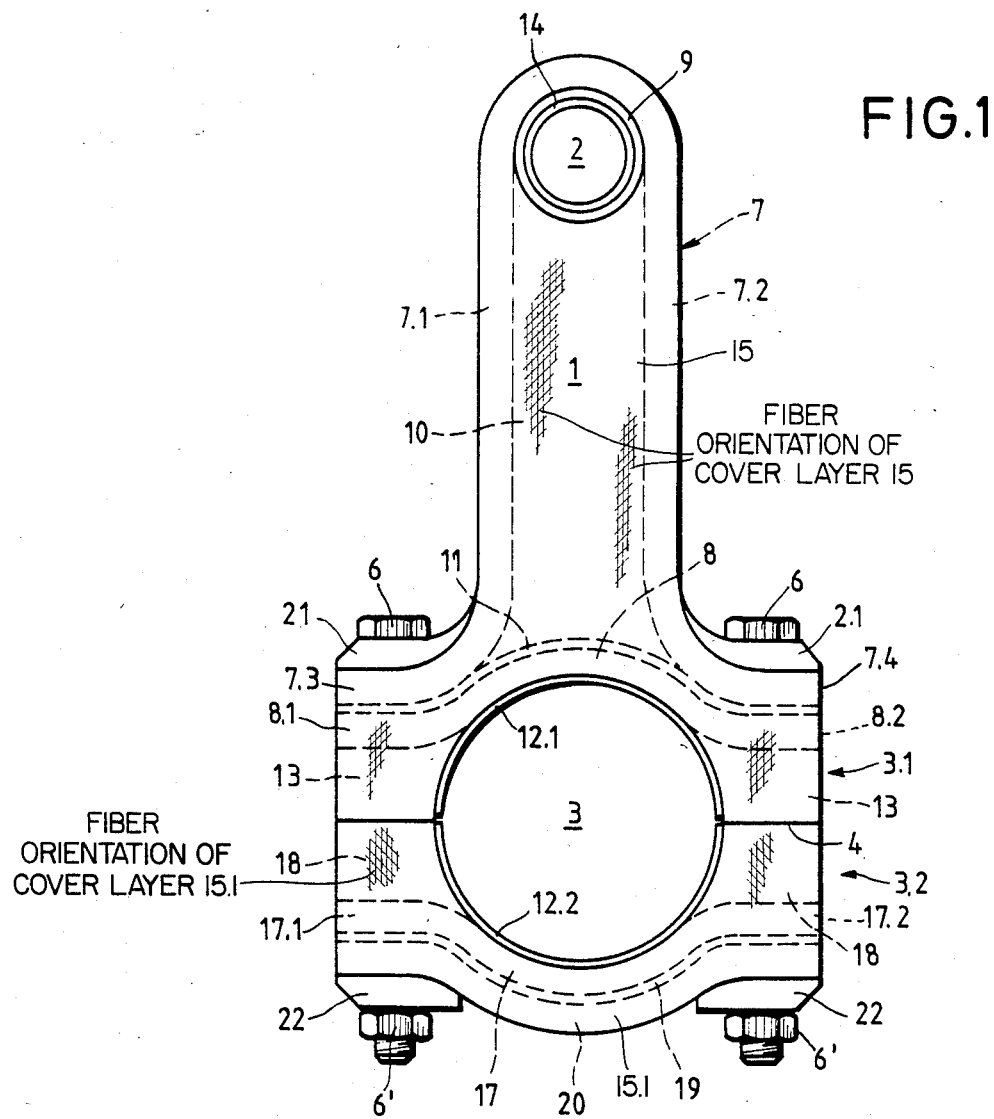
FIG. 1 is an elevational side view of a connecting rod according to the invention illustrating one embodiment of a crankshaft rod.
Figure 2:
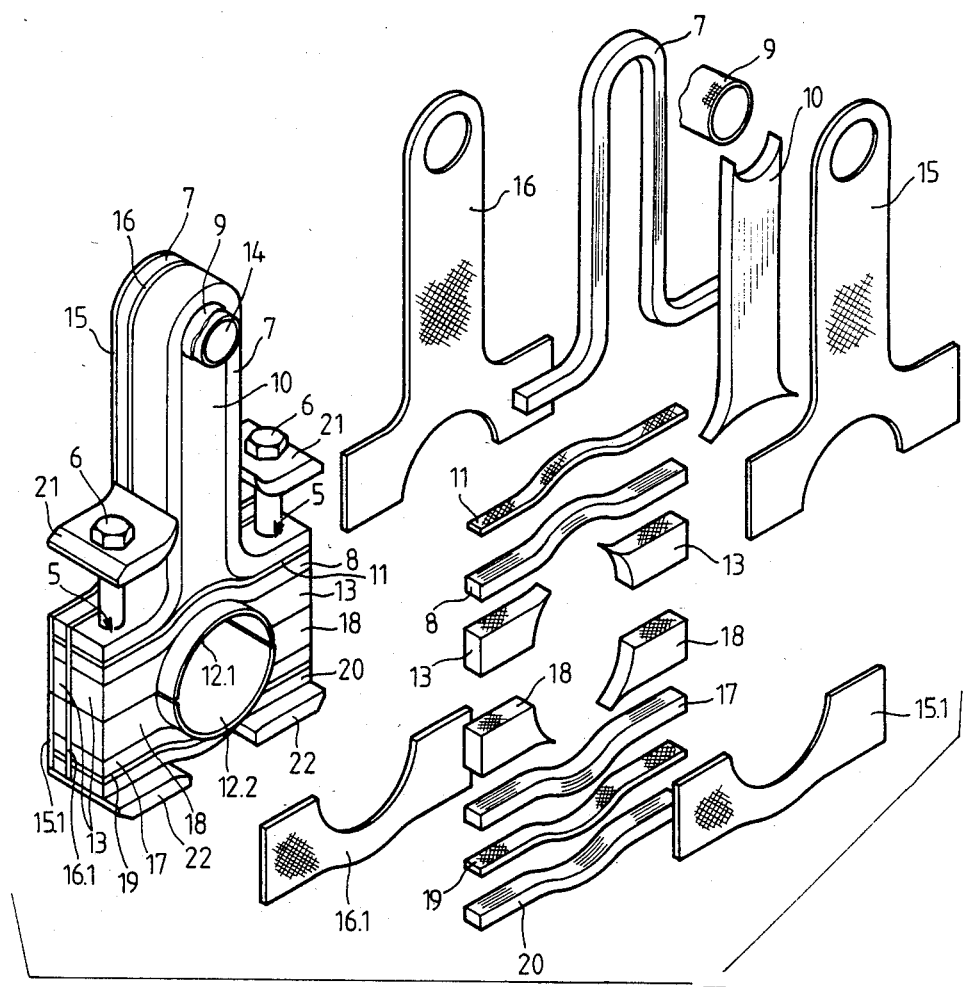
FIG. 2 is a partially assembled and partially exploded perspective view of the crankshaft rod according to FIG. 1.

FIGS. 1 and 2 show a connecting rod in the form of a crankshaft rod having a shaft 1, a small end bearing 2 and a big end bearing 3. The small end bearing 2 is, for example, connectable to a piston bolt while the bearing 3 is connectable to a crankshaft pin. The bearing 2 is a closed cylindrical bearing, while the bearing 3 is divided along a separation plane 4 to facilitate the connection of the big end to a crankshaft. For this purpose, the big end is divided into an open shell end portion 3.1 including an inwardly disposed bearing bail 8 and an outwardly disposed bearing cover bail 3.2 forming a further half shell. The rod further comprises an open ended loop 7 of fiber compound material having loop legs 7.1 and 7.2 with free loop leg ends forming flanges 7.3 and 7.4. These flanges 7.3 and 7.4 form together with the inwardly disposed bearing bail 8 one half of the divided rod end portion 3.1, the other half of which is formed by the outer bearing cover bail 3.2. The rod end portion 3.1 and the outer cover bail 3.2 are shaped to form respective half shells which receive the bearing 3 proper, for example, in the form of bearing half shells 12.1 and 12.2. The inner bearing bail 8 form flanges 8.1 and 8.2. The outer cover bail 3.2 includes at least one bail member 17 with flanges 17.1 and 17.2. Necked down screw bolts 6 with nuts 6' hold the bearing cover bail 3.2 and the open shell end portion 3.1 together. Additional elements will be described below.

The orientation of the fibers in the open loop 7 and in the loop legs 7.1 and 7.2 is unidirectional substantially in parallel to a longitudinal vertical axis of the rod. The vertical lines in the portion of the open loop 7 shown exploded in FIG. 2 illustrate this feature. The flange forming ends 7.3 and 7.4 extend radially or rather substantially perpendicularly to said longitudinal rod axis. The fiber compound material of all components comprises, for example, carbon fibers embedded in a synthetic resin matrix, whereby all metal components for connecting purposes have been avoided, except for the bolts 6 and nuts 6'. Yet, the connecting rod according to the invention has not shown any diminishing in its required strength. The inwardly disposed bearing bail 8 is also made of unidirectionally oriented fiber strands extending from one free flange forming end 8.1 to the other free flange forming end 8.2 of the fiber loop 7. The lines in the portion of the inner bearing bail 8 shown exploded in FIG. 2 illustrate this feature. The bail 8 interconnects the loop ends in a force transmitting manner.

The space between the loop legs 7.1 and 7.2 is taken up by a compression rod 10 embedded between the legs 7.1 and 7.2 and extending between a bearing cylinder 9 and the inwardly disposed bearing bail 8. The loop 7 loops around the bearing cylinder 9 which may comprise a bearing shell or bushing 14. Both, the cylinder 9 and the shell 14 are made of fiber compound material preferably at a 0°/90° orientation relative to the bearing axis of the bearing 2. The compression rod or member 10 is also made of fiber compound material in which the fiber strands have a unidirectional orientation in parallel to the longitudinal axis of the connecting rod. This compression member makes sure that the connecting rod is capable of taking up compression loads as well as shearing loads or stress.

An intermediate layer 11 of fiber compound material is interposed between the inner bearing bail 8 and the flanges 7.3, 7.4 and the compression member 10. The fibers in the layer 11 are oriented crosswise relative to the bail 8. The fibers in the layer 11 may be a webbing or a ply-type arrangement which provides the necessary strength for taking up the bearing pressure in the bores 5 (FIG. 2) through which the bolts 6 extend. Even the inner bearing bail 8 itself may have inserted layers with a crosswise fiber orientation relative to the generally unidirectional fiber orientation of the bail 8. Similarly the intermediate layer 11 may be a multiply layer with plies having a unidirectional fiber orientation in addition to the generally crosswise fiber orientation of the layer 11. The crosswise fiber orientation is ±45° and 0°/90° relative to the length of the bail.

To properly surround the bearing shell 12.1 there are provided filler members 13 in the zones through which the bolts 6 extend. The filler members 13 contact the inner bearing bail 8 and are also made of a fiber compound material in which the reinforcing fibers form a webbing or a ply-type fiber arrangement. The fiber orientation in the filler member 13 is preferably ±45° and 0°/90° in alternating layers and relative to the longitudinal bearing axis extending perpendicularly to the plane of FIG. 1. As mentioned above, the bearing shell 14 is embedded in the bearing cylinder 9 at the upper or small end of the crankshaft rod thus forming a closed bearing at said small end. The compound bonding between all components, for example of the compression rod 10 to the closed bearing 9, 14 and to the loop forming fiber strands is achieved by the curing of the embedding resin matrix. The fiber orientation in the bearing 9 is also in a 0°/90° arrangement relative to the axis of the bearing 2 extending in parallel to the axis of the bearing 3.

The outer facing surfaces of the bearing are covered by cover layers 15. The following elements, namely, the loops 7, the bearing bail 8, the compression rod 10, the intermediate layer 11 and the filler members 13 are divided in the longitudinal direction by intermediate layers 16 extending in parallel to the cover layers 15. The fiber orientation in the cover layers 15 and in the intermediate layers 16 is preferably arranged at ±45° relative to the longitudinal rod axis as shown in the exploded part of FIG. 2. The reinforcement fibers in the layers 15 and 16 may be provided in the form of a webbing or in the form of a ply-type arrangement of the fibers.

The structure of the outer bearing cover bail 3.2 is substantially mirror-symmetrical to the structure of the open rod end 3.1. Two bail members 17 and 20 with an intermediate layer 19 form the outer bail and filler members 18 are inserted to face the filler members 13 as best seen in FIG. 2. The filler members 18 embed the second half bearing shell 12.2. The elements 17, 19 and 20 correspond to the loop around the bearing 2. Here again, cover layers 15.1 and intermediate separation layers 16.1 are provided as also best seen in FIG. 2. The fiber orientation in layers 15.1 and 16.1 is preferably also of the ±45° cross-over type as shown in the exploded part of FIG. 2. Pressure distribution elements such as washer type metal elements 21 and 22 are located as shown in FIGS. 1 and 2 for eliminating compression peaks when the nuts 6' on the bolts 6 are tightened. For this purpose the washers 21 and also the washers 22 are tapering out along a curve to snuggly fit into the respective curve between the loop legs 7.1, 7.2 and the respective flange ends 7.3 and 7.4. Similarly, the washer members 22 are curved to conform to the curve of the bail 20.

As best seen in FIG. 2, the present crankshaft rod comprises a compound structure assembled from a plurality of fiber compound components which are made as cut slices so to speak from extruded rods of fiber compound materials having the desired cross-sectional configurations or which are made as stamped components cut from sheet material of fiber compound material. Thus, it is possible to assemble the present crankshaft rod in the manner of a modular system which is ideally suitable for mass production purposes.

Incidentally, the fiber orientation in the elements 17, 18, 19 and 20 as well as 15.1 and 16.1 is the same as described above with reference to the open end portion of the connecting rod.

Figures 3, 4:
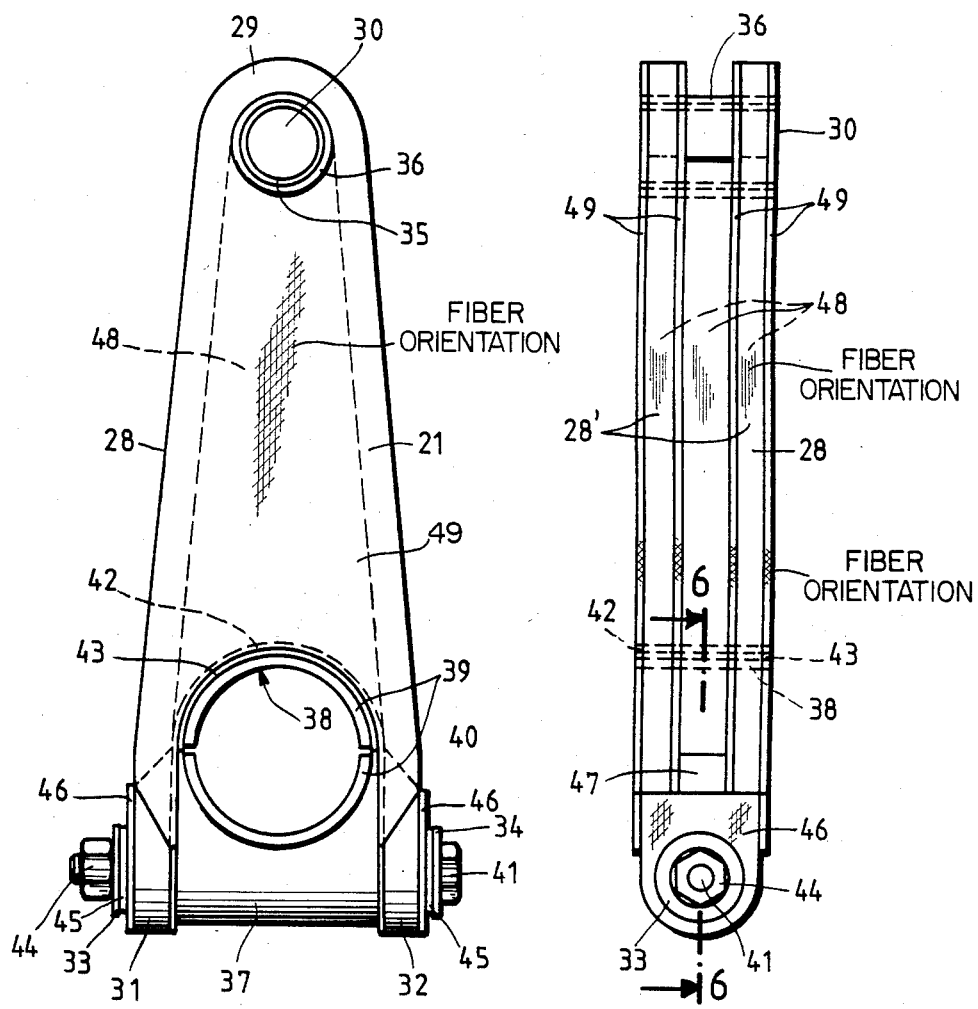
FIG. 3 shows an elevational side view of a further crankshaft connecting rod according to the invention using a closed endless fiber reinforced loop folded to again form an open loop.
FIG. 4 is a side view of the embodiment of FIG. 3.
Figure 5:
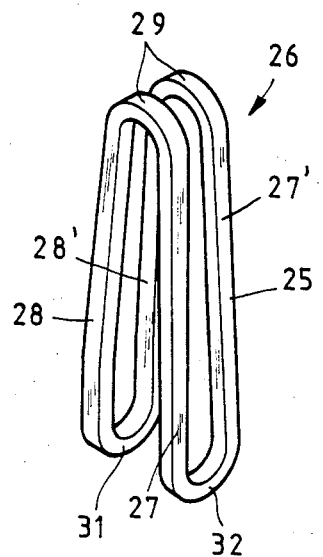
FIG. 5 illustrates a perspective view of an endless fiber reinfolded loop folded once to form an open loop.
Figure 6:
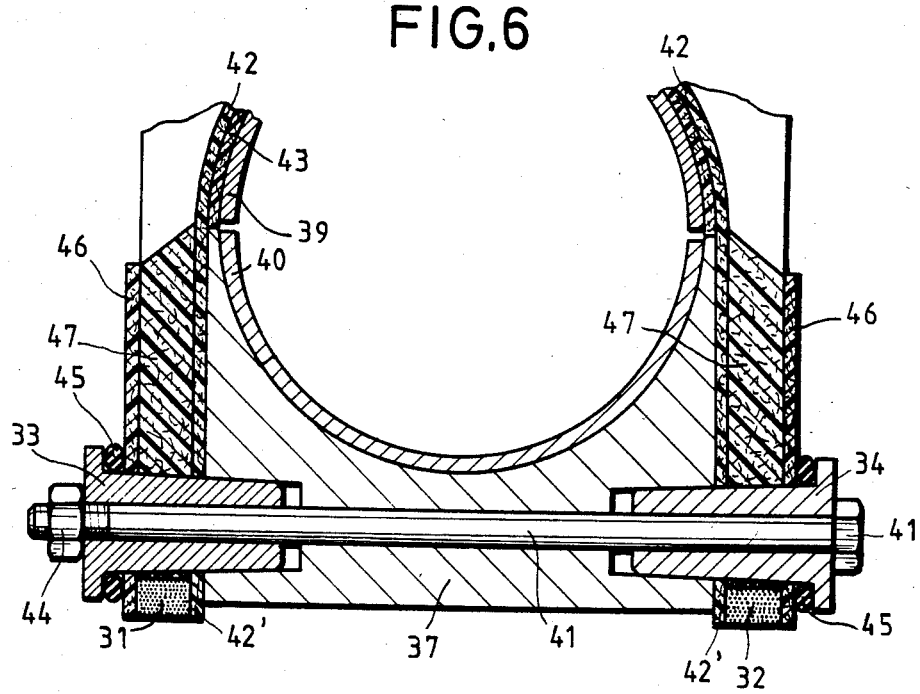
FIG. 6 is a sectional view through the big end of the crankshaft rod of FIG. 3 along section line 6—6 in FIG. 4.

FIG. 3 illustrates another embodiment of a crankshaft rod according to the invention employing an endless loop 25 which is folded at least once to form an open loop 26 as shown on a reduced scale in FIG. 5. The folded loop has two double legs 27 and 27' as well as 28 and 28'. These legs form an upper double bight 29 looping around the small end closed bearing 30 shown in FIGS. 3 and 4. The loop legs form two further bights 31 and 32 looping around metal inserts 33 and 34 as best seen in FIG. 6 to be described below. The closed bearing 30 has a bearing sleeve 35 surrounded by a bearing shell 36 as shown in FIG. 3.

For mounting the crankshaft rod according to the invention to a crankshaft pin, the big end of the rod is divided as described above, however, the division is accomplished by the above mentioned loop 31, 32 and an outer bearing cover bail 37 cooperating with an inner bearing bail 38 having a saddle type inner bail member 42 looping around a first divided bearing shell 39 cooperating with a second bearing shell 40 resting in the outer bearing bail 37 through which a bolt 41 extends as best seen in FIG. 6. The bolt 41 extends through the metal inserts 33 and 34 which are preferably conically shaped, reaching into respective recesses in the outer bearing cover bail 37. The saddle shaped inner bearing bail 42 loops around the half bearing shell 39 preferably around an insert layer 43 interposed between the bail 42 and the shell 39. The bail 42 has legs 42' extending all the way down around the inserts 33 and 34 as best seen in FIG. 6 which incidentally is shown on an enlarged scale relative to the other illustrations of FIGS. 3, 4 and 5.

The bolt 41 is secured by a nut 44, whereby preferably elastic washers 45 are inserted between the respective insert 33, 34 and the adjacent cover layer 46. A filler member 47 extends around the inner bail 42 and into cooperation with the inserts 33, 34. A compression member 48 is inserted between the bearing shell 36 and the inner bail 42 on the one hand, and between the loop legs 27, 28, 27', 28'. The fiber orientation in the compression member 48 is substantially unidirectionally and in parallel to the longitudinal axis of the connecting rod. Cover layers 49 are covering the loop legs 27, 27', 28, 28' on both sides.

All of the described components, except for the metal inserts 33, 34 and the bolt 41 with its nut 44, are made of fiber compound materials with the fibers arranged as follows. The fibers in the endless loop 25 are unidirectionally oriented relative to the longitudinal axis of the connecting rod. These fibers are embedded in a synthetic resin matrix and the fibers are made, for example, of carbon. The fiber orientation in the bail 42 extends substantially at a ±45° arrangement relative to the length of the bail 42 from the left-hand end in FIG. 6 to the right-hand end thereof. A material locking force transmitting connection between the bail 42 and the loops 31, 32 provides the required shearing strength and stiffness against bending as well as the necessary strength for the bearing load around the holes into which the inserts 33, 34 extend. The cover layers 46 have a fiber orientation of ±45°. The same ±45° fiber orientation may also be provided in the spacer member 47. As mentioned, the fiber orientation in the compression rod 48 is unidirectional substantially in parallel to the legs 27, 27', 28, 28'. The fiber orientation in the closed bearing components 35 and 36 is preferably at 0°/90° relative to the bearing axis. The fiber orientation in the cover layers 49 which increase the shearing strength of the rod including that of the compression rod 48 is again at a ±45° arrangement of the fibers, such as carbon fibers in a synthetic resin matrix. The fibers may be provided in the form of a webbing or in a ply-type arrangement.

The intermediate layer 43 has a thickness corresponding to the thickness of the upper tips of the bail 37 to provide for an abutting between the lower ends of the intermediate layer 43 and the upper ends of the bail 37. In this type of arrangement with the bolt 41 forming a yoke-type structure for interconnecting the loops 31, 32 there is no limitation with regard to the material selection for making the outer bearing cover bail 37. Thus, the bail 37 may be made, for example, of a light metal rather than of synthetic material. In any event, the separated half shells 39 and 40 may be used in connection with a light metal construction of the bail 37 or in connection with a construction in which the bail 37 is made of fiber compound material.

Referring especially to FIG. 6, it will be appreciated, that the positioning of the cover bail 37 relative to the inner bail 42 is adjustable by the tightening of the nut 44 and by the positioning of the conical inserts 33, 34 under the effect of the elastic washers 45. The conical inserts will avoid any play. If desired, these inserts may even provide a certain biasing or pretightening of the bearing on the crankshaft pin not shown. For this purpose, it may be desirable to provide each insert 33, 34 with a threading reaching into a respectively threaded deadend hole in the bail 37. Further, it is not necessary to employ a throughgoing bolt 41. Rather, two individual threaded bolts may reach into respectively threaded holes in the bail 37. In that instance the use of the inserts 33, 34 may not be necessary. However, such inserts are quite helpful in the proper positioning of the big end of the rod on a crankshaft pin. The elastic washers 45 help evenly distributing the bearing pressure of the inserts 33, 34. Cover layers 49 having a fiber orientation of ±45° cover and divide the compression member 48. Incidentally, the bearing shells 39 and 40 are preferably held in position by a suitable adhesive, known as such.

Although the invention has been described with reference to specific example embodiments, it will be appreciated, that it is intended, to cover all modifications and equivalents within the scope of the appended claims.

What is claimed is:

1. A connecting rod made of fiber reinforced synthetic material and having a longitudinal rod axis, comprising a first rod head at one end of the rod, said first rod head including a cylindrical closed bearing, a second rod head at the other end of the rod, said second rod head forming a divided bearing including an inwardly disposed inner bearing bail made of a fiber compound material with fibers having a length extending from end to end of said inner bearing bail, and an outwardly disposed bearing cover bail, said rod further comprising an open loop made of fiber compound material with unidirectionally oriented fiber strands looping around said closed bearing and forming two loop legs having free ends bent laterally away substantially at right angles from said rod axis to form two flanges with bores therein, said fiber strands of said open loops having a length extending in said open loop from free end to free end of said open loop and into said flanges, and a compression member made of fiber compound material with fiber strands oriented substantially in parallel to said longitudinal rod axis, said compression member extending lengthwise between said closed bearing and said inwardly disposed bearing bail and laterally between said loop legs, said inwardly disposed bearing bail interconnecting said loop flanges in a force transmitting manner for holding said loop legs with their free ends together, said cover bail also having flanges with bores at its ends, and connecting means extending through all bores for connecting all flanges for mounting the connecting rod, whereby said inner bearing bail in cooperation with said connecting means holds said free loop ends in place.

2. The rod of claim 1, wherein the fibers in said inner bail are oriented in a unidirectional relationship.

3. The rod of claim 1, further comprising cover layers on said open loop and intermediate layers in said loop, in said inner bail, and in said compression member, said layers extending in parallel to said rod axis and having fibers arranged in a crosswise orientation.

4. The rod of claim 1, further comprising an intermediate layer between said inner bail and said loop flanges, said compression member being connected to said intermediate layer extending in parallel to said inner bail, said inner bail having a unidirectional fiber orientation, said intermediate layer having a crosswise fiber orientation.

5. The rod of claim 1, further comprising filler members operatively interposed between the ends of said inner bail and of said cover bail, said filler member having a crosswise fiber orientation.

6. The rod of claim 1, wherein said cylindrical closed bearing comprises a bearing cylinder made of fiber compound material having a crosswise fiber orientation, especially a 0°/90° fiber orientation relative to a bearing axis of said bearing cylinder.

7. The rod of claim 1, wherein said cover bail comprises a plurality of fiber compound layers having the same fiber orientation as said inner bail, said fiber compound layers being shaped with flanges to conform to the shape of the cover bail.

8. The rod of claim 1, further comprising an intermediate layer (11) of fiber compound material between said flanges and said inner bearing bail (8), said intermediate layer (11) having fibers oriented in a cross-over relationship relative to one another.

9. The rod of claim 1, wherein said fibers in said inner bearing bail are oriented in a unidirectional fiber orientation.

10. A connecting rod made of fiber reinforced synthetic material and having a longitudinal rod axis, comprising a first rod head at one end of the rod, said first rod head including a cylindrical closed bearing, a second rod head at the other end of the rod, said second rod head forming a divided bearing including an inwardly disposed inner bearing bail made of a fiber compound material having fibers extending from end to end of said inner bearing bail forming a saddle, an outwardly disposed bearing cover bail cooperating with said saddle in forming said divided bearing, said rod further comprising an endless fiber loop folded back on itself for forming an open loop made of said fiber compound material with unidirectionally oriented fiber strands looping around said closed bearing, said endless fiber loop forming two loop legs having free ends, each free end forming a closed leg loop, a compression member made of fiber compound material with fiber strands oriented substantially in parallel to said longitudinal rod axis, said compression member extending lengthwise between said closed bearing and resting on said saddle formed by said inwardly disposed bearing bail and laterally between said loop legs, said inwardly disposed bearing bail and said cover bail extending between said closed loop legs, and connecting bolt means extending through one of said closed leg loops, through said inner bearing bail, through said cover bail and then again through said inner bearing bail and through the other of said leg loops for mounting the connecting rod, said connecting bolt means connecting said bails and said closed loop legs in a force transmitting manner.

11. The rod of claim 10, wherein said connecting means comprise a bolt and nut extending perpendicularly to said rod axis.

12. The rod of claim 10, further comprising a filler member between the loop legs which also functions as a spacer.

13. The rod of claim 10, further comprising cover layer means covering said leg loops, said cover layer means being made of fiber compound material having a crosswise fiber orientation.

14. The rod of claim 10, further comprising cover layers covering said loop legs, said cover layers being made of fiber compound material having a crosswise fiber orientation.

15. The rod of claim 10, wherein said closed bearing comprises a closed bearing cylinder made of fiber compound material having a crosswise fiber orientation, especially a 0°/90° fiber orientation relative to a bearing axis of said closed bearing.

16. The rod of claim 10, wherein said inner bail is made of fiber compound material having a crosswise fiber orientation relative to the length from end to end of the inner bail, especially a ±45° fiber orientation.

17. The rod of claim 10, further comprising a spacer layer between said inner bail and said divided bearing, said spacer layer having a thickness corresponding to a given thickness of upper ends of said outer bearing cover bail to form an abutting joint between said spacer layer and said upper ends of said cover bail.

18. The rod of claim 10, wherein said compression member comprises a plurality of fiber compound material layers at least one of which has a fiber orientation extending in the longitudinal direction of the rod axis.

19. The rod of claim 10, wherein said bearing cover bail is made of metal.

* * * * *